(12) United States Patent
Vijayvargiya et al.

(10) Patent No.: US 11,847,485 B2
(45) Date of Patent: Dec. 19, 2023

(54) NETWORK-EFFICIENT ISOLATION ENVIRONMENT REDISTRIBUTION

(71) Applicant: VMware, Inc., Palo Alto, CA (US)

(72) Inventors: Shirish Vijayvargiya, Pune (IN); Priyal Rathi, Pune (IN); Shailendra Singh Rana, Pune (IN); Rayanagouda Bheemanagouda Patil, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/723,651

(22) Filed: Apr. 19, 2022

(65) Prior Publication Data

US 2022/0244982 A1 Aug. 4, 2022

Related U.S. Application Data

(63) Continuation of application No. 16/134,502, filed on Sep. 18, 2018, now Pat. No. 11,327,780.

(51) Int. Cl.
*G06F 9/455* (2018.01)
*H04L 41/085* (2022.01)
*H04L 67/148* (2022.01)
*G06F 9/50* (2006.01)

(52) U.S. Cl.
CPC ........ *G06F 9/45558* (2013.01); *G06F 9/5088* (2013.01); *H04L 41/085* (2013.01); *H04L 67/148* (2013.01); *G06F 2009/4557* (2013.01); *G06F 2009/45595* (2013.01)

(58) Field of Classification Search
CPC .............................. G06F 9/4557; G06F 9/5088
See application file for complete search history.

(56) References Cited

U.S. PATENT DOCUMENTS

| | | | | |
|---|---|---|---|---|
| 9,052,935 B1* | 6/2015 | Rajaa | .................. | G06F 9/45558 |
| 10,270,815 B1* | 4/2019 | Roche | .................. | H04L 67/125 |
| 10,284,670 B1* | 5/2019 | Roche | .................. | H04L 67/125 |
| 10,798,018 B2* | 10/2020 | Yousaf | .................. | G06F 9/5077 |
| 10,824,456 B2* | 11/2020 | Singh | .................. | G06F 9/45558 |
| 2010/0145665 A1* | 6/2010 | Mujtaba | .................. | G06T 19/20 703/1 |
| 2013/0097319 A1* | 4/2013 | Ahmad | ............... | G06F 9/45533 709/226 |
| 2013/0304899 A1* | 11/2013 | Winkler | ................ | G06F 9/5088 718/1 |

(Continued)

*Primary Examiner* — Douglas B Blair
(74) *Attorney, Agent, or Firm* — Thomas | Horstemeyer, LLP

(57) ABSTRACT

Network-efficient isolation environment redistribution is described. In one example, network communications are surveyed among isolation environments, such as virtual machines (VMs) and containers, hosted on a cluster. An affinity for network communications between the isolation environments can be identified based on the survey. Pairs or groups of the isolation environments can be examined to identify ones which have an affinity for network communications between them but are also hosted on different host machines in the cluster. The identification of the affinity for network communications provides network-level context for migration decisions by a distributed resource scheduler. Certain VMs and/or containers can then be migrated by the distributed resource scheduler to reduce the network communications in the cluster based on the network-level context information.

20 Claims, 4 Drawing Sheets

(56) References Cited

U.S. PATENT DOCUMENTS

| | | | |
|---|---|---|---|
| 2014/0059228 A1* | 2/2014 | Parikh | H04L 67/1012 |
| | | | 709/226 |
| 2014/0229949 A1* | 8/2014 | Cai | G06F 9/5033 |
| | | | 718/1 |
| 2014/0278326 A1* | 9/2014 | Sharma | G06F 9/5066 |
| | | | 703/13 |
| 2017/0063722 A1* | 3/2017 | Cropper | H04L 47/82 |
| 2017/0068557 A1* | 3/2017 | Cropper | G06F 9/45558 |
| 2017/0093921 A1* | 3/2017 | Duan | H04L 63/1408 |
| 2017/0147383 A1* | 5/2017 | Hudzia | G06F 9/5088 |
| 2017/0257424 A1* | 9/2017 | Neogi | H04L 45/122 |
| 2017/0371717 A1* | 12/2017 | Kiess | G06F 9/5077 |
| 2018/0159782 A1* | 6/2018 | Madan | H04L 45/7453 |
| 2018/0293093 A1* | 10/2018 | Jain | G06F 9/45558 |
| 2018/0331885 A1* | 11/2018 | Raymond | H04L 41/0897 |
| 2018/0331905 A1* | 11/2018 | Toledo | H04L 41/5025 |
| 2018/0367434 A1* | 12/2018 | Kushmerick | H04L 43/04 |
| 2019/0026206 A1* | 1/2019 | Harutyunyan | G06F 11/0781 |
| 2019/0102213 A1* | 4/2019 | Yousaf | H04L 43/20 |
| 2019/0235903 A1* | 8/2019 | Singh | H04L 43/026 |

* cited by examiner

NETWORK-EFFICIENT ISOLATION ENVIRONMENT REDISTRIBUTION

CROSS-REFERENCE TO RELATED APPLICATIONS

This application is continuation of, and claims priority to, co-pending U.S. patent application entitled "Network Efficient Isolation Environment Redistribution," filed on Sep. 18, 2018, and assigned application Ser. No. 16/134,502, which is incorporated herein by reference in its entirety.

BACKGROUND

As host hardware platforms have grown larger, with greater processor core counts and available memory, virtualization has become important for the efficient and effective use of computing resources. Virtualization is directed to the creation of virtual (rather than physical or actual) instances of computing resources, such as processors, memories, storage devices, network interfaces, and peripheral devices, among others. Virtualization can result in the creation of isolated environments for the execution of applications under the control of virtualization software on one or more host hardware platforms. A host hardware platform on which a hypervisor or container manager runs can be called a host machine.

A hypervisor can include one or more virtual machine monitors (VMMs) to provide monitoring services for the isolated environments for the execution of applications. A VMM can be a combination of computer software, firmware, and hardware that supports the execution of guest operating systems and/or the applications executing in the isolated environments. Thus, the hypervisor presents guest operating systems with a virtual operating platform and manages the execution of guest operating systems and related applications.

Containerization is another virtualization technique that relies on isolated containers executing on a virtual machine or directly on a host machine. In containerization, an abstraction layer is configured using the kernel of an operating system executing on the virtual or host machine. A container relies on the functionality of the kernel in order to run applications, with certain resource constraints (e.g., memory, processing time, or other constraints) and isolation from other applications.

Host hardware platforms on which virtual machines and containers execute can operate with peripheral devices. Peripheral devices can include input devices (e.g., keyboards, pointing devices, tablets, touch screens, image scanners, microphones, cameras, barcode readers, and other input devices), output devices (e.g., display devices, printers, speakers, and other output devices), storage devices (e.g., external hard drives, linear tape-open (LTO) drives, flash drive/solid-state drives, CD- and DVD-ROM drives, and other storage devices), network interface devices (e.g., modems, network interface controllers, and other network interface devices), among other peripheral devices. Each peripheral device requires host computing system resources, such as processor time, input/output bandwidth on various data buses, and physical memory space.

In many cases, when a peripheral device is attached to a host computing system, the peripheral device is not available to virtual machines configured to run on other host computing systems, even if the host computing systems are on the same cluster of computing systems interconnected with each other over a computer network. Similarly, the peripheral device may not be available to containers configured to run on host computing systems other than that to which the peripheral device is attached.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
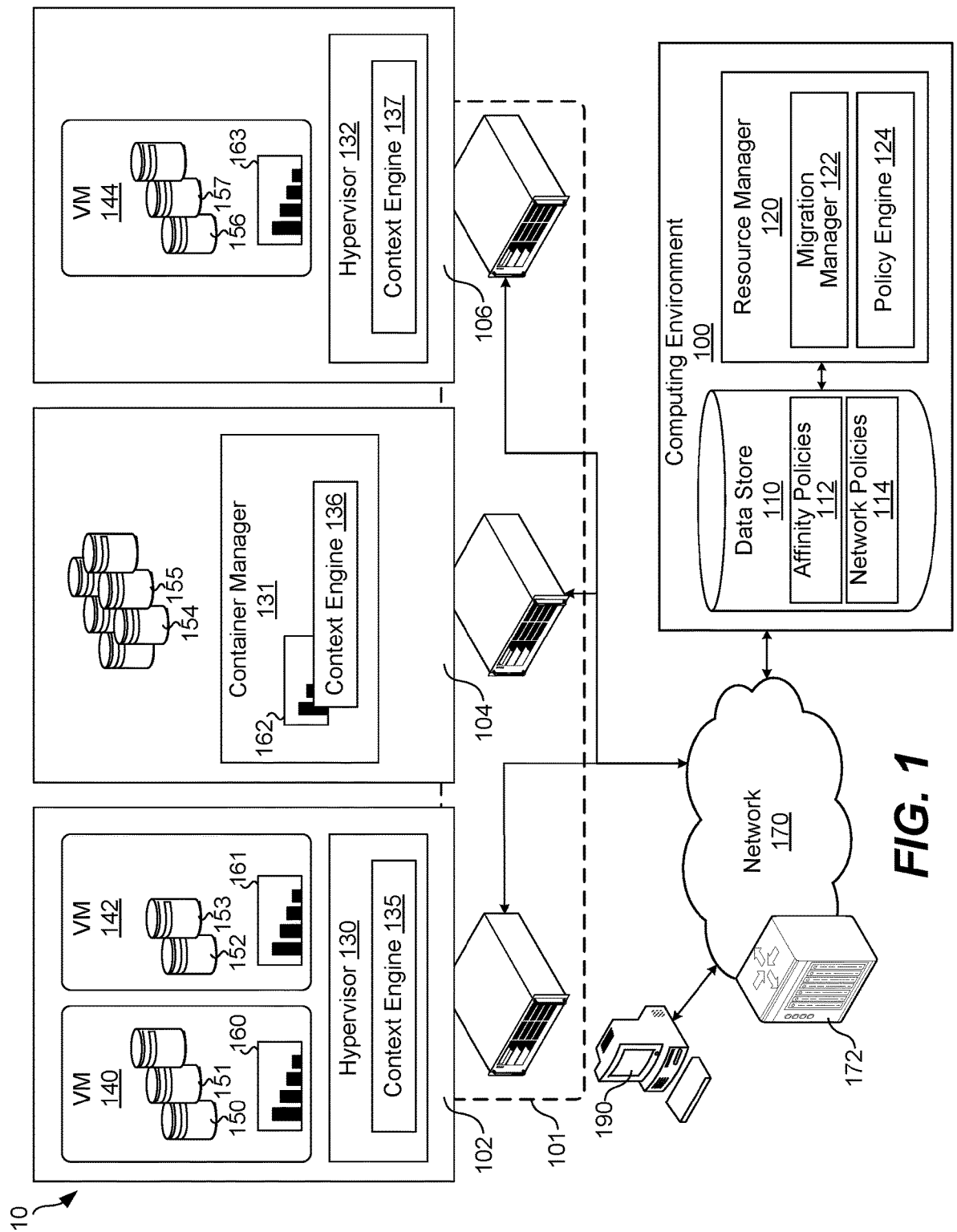
FIG. 1 illustrates an example networked environment for network efficient isolation environment redistribution according to various examples described herein.

As noted above, virtualization is directed to the creation of virtual instances of computing resources, such as processors, memories, storage devices, and network interfaces, among computing resources. Virtualization can be relied upon to create isolated environments for the execution of applications under the control of virtualization software on one or more host hardware platforms.

A hypervisor can be relied upon to manage one or more virtual machines (VMs) on a host or in a distributed computing resource cluster of multiple hosts through the virtual replication of hardware. A VM is one example of an isolated environment for the execution of an operating system and various applications. Similar to a VM, a container is an example of an isolated environment and is typically relied upon for the execution of applications. A container manager can be relied upon to simplify how an administrator adds or replaces containers on a host machine or in a distributed computing resource cluster. Thus, a container manager can automate the creation, destruction, and deployment of a large number of containers.

Both VMs and containers provide isolated environments for the execution of software. A number of containers can rely upon the same underlying operating system to provide basic services to all containerized applications using virtual-memory support for isolation. VMs, on the other hand, typically execute separate, isolated operating systems using hardware VM support. Overall, containers require less processing and memory overhead than VMs, and containers are typically relied upon in computing environments where thousands of containers are needed.

The multitier architecture for applications provides a model by which developers can create applications using a flexible and reusable approach. By separating parts of an application into tiers, it is possible to separately develop, modify, and add layers individually, rather than redeveloping the entire application. As one example, a three-tier architecture is typically composed of a presentation tier, a domain logic tier, and a data storage tier. Containers are being adopted for the execution of different tiers of an application in separate, isolated environments, sometimes even on different host machines. The manner in which the containers for such multitier applications are distributed among a host machine in a distributed computing resource cluster can significantly impact the amount of network traffic in the distributed computing resource cluster.

In the context outlined above, network-efficient isolation environment redistribution is described herein. To reduce the level of network communications in a distributed computing resource cluster, network communications are surveyed among isolation environments, such as VMs and containers, hosted on the cluster. An affinity for network communications between the isolation environments can be identified based on the survey. Pairs or groups of the isolation environments can be examined to identify ones which have an affinity for network communications between them but are also hosted on different host machines in the cluster. The identification of the affinity for network communications provides network-level context for migration decisions by a distributed resource scheduler. Certain VMs and containers can then be migrated by the distributed resource scheduler to reduce the network communications in the cluster based on the network-level context information. In some cases, migration decisions can be conducted with reference to both network-level context information and other application-affinity policies.

Turning to the drawings, the following paragraphs provide an outline of a networked environment followed by a discussion of the operation of the same. FIG. 1 illustrates an example networked environment for network efficient isolation environment redistribution according to various examples described herein. The networked environment 10 includes a computing environment 100, a distributed computing resource cluster 101 ("cluster 101") of host computing machines 102, 104, and 106, among others, and a client device 190 in communication with each other over the network 170. The networked environment 10 is provided as a representative example for purposes of discussion and can include other components not illustrated in FIG. 1. Similarly, the host computing machines 102, 104, and 106 are example hosts in the distributed computing resource cluster 101, but any number of host machines can be relied upon to form the cluster 101. A number of isolated environments, such as VMs and containers, are hosted on the host computing machines 102, 104, and 106 in the cluster 101 as described in further detail below.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied, in part, by one or more of the host computing machines 102, 104, and 106. As further described below, the computing environment 100 can also be embodied, in part, as certain functional or logical (e.g., computer-readable instruction) elements or modules.

The computing environment 100 can function as a resource manager for the cluster 101. The computing environment 100 includes the data store 110 and the resource manager 120. The data store 110 includes memory areas to store various rules and policies associated with resource distribution management in the cluster 101, including a memory area for the affinity policies 112 and a memory area for the network policies 114, both of which are described in further detail below. The resource manager 120 includes the migration manager 122 and the policy engine 124, both of which are described in further detail below.

As an introduction, the resource manager 120 acts as a manager of the computing resources available among the host computing machines 102, 104, and 106. To that end, the resource manager 120 can refer to the rules and policies stored in the data store 110, which are related to the allocation of the physical resources in the cluster 101 to the VMs and containers hosted on the cluster 101. The resource manager 120 can manually or automatically scale the resources available, instantiate and shutdown VMs and containers, and migrate VMs and containers among the host computing machines 102, 104, and 106 in the cluster 101, among other operations. As one example, if the workload on one or more of the host computing machines 102, 104, and 106 changes significantly, the resource manager 120 can redistribute the VMs and containers among the host computing machines 102, 104, and 106, as necessary. Additionally, as described in further detail below, the resource manager 120 can redistribute the VMs and containers based on network-level context information gathered among the host computing machines 102, 104, and 106.

The host computing machines 102, 104, and 106 can be embodied as one or more computers, computing devices, or computing systems similar to the computing environment 100. As shown in FIG. 1, the host computing machine 102 hosts the VM 140 and the VM 142 at the direction of the hypervisor 130. The VM 140 hosts the containers 150 and 151, among others, in which one or more applications can execute in isolated environments. The VM 142 hosts the containers 152 and 153, among others, in which one or more applications can execute in isolated environments. Among other applications executing on the VM 140, the VM 140 includes a traffic daemon 160. Similarly, among other applications executing on the VM 142, the VM 142 includes a traffic daemon 161. The traffic daemons 160 and 161 can be embodied as background processes that monitor or survey the inbound and outbound network traffic to and from the VMs 140 and 142, respectively, including network traffic to and from the applications executing in the containers 150-153. As described in further detail below, the context engine 135 gathers data on the network traffic from the traffic daemons 160 and 161 and consolidates it for further analysis by the resource manager 120.

The host computing machine 104 hosts the containers 154 and 155 at the direction of the container manager 131. As compared to the host computing machine 102, the containers 154 and 155 are not instantiated within a VM. Instead, the containers 154 and 155 both rely upon an operating system executing directly on the host computing machine 104 to provide basic services, such as virtual-memory support for isolation. The container manager 131 includes the traffic daemon 162 to monitor the inbound and outbound network traffic to and from the applications executing in the containers 154 and 155. The container manager 131 also includes the context engine 136, which gathers data on the network traffic from the traffic daemon 162 and consolidates it for further analysis by the resource manager 120.

The host computing machine 106 hosts the VM 144, among others, at the direction of the hypervisor 134, and the VM 144 hosts a number of containers, including the containers 156 and 157. The VM 144 includes a traffic daemon 163. The traffic daemon 163 monitors or surveys the inbound and outbound network traffic to and from the applications executing on the VM 144, including the applications executing in the containers 156 and 157. As described in further detail below, the context engine 137 of the hypervisor 132 gathers data on the network traffic from the traffic daemon 163 and consolidates it for further analysis by the resource manager 120.

The network 170 can include the Internet, intranets, extranets, wide area networks (WANs), local area networks (LANs), wired networks, wireless networks, cable networks, satellite networks, other suitable networks, or any combinations thereof. As one example, the computing environment 100, the client device 190, and the host computing machines 102, 104, and 106 in the cluster 101 can be coupled to LANs, WANs, and the Internet for network-based data communication among each other. Although not shown in FIG. 1, the network 170 can also include network connections to any number and type of network hosts or devices, such as website servers, file servers, cloud computing resources, databases, data stores, or any other network or computing architectures.

The client device 190 is representative of one or more client devices. The client device 190 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 190 can include various peripheral devices or components. The client device 190 can be relied upon by an administrator to control various operating aspects of the resource manager 120. For example, the administrator can define certain rules and policies stored in the affinity policies 112 and the network policies 114 as described herein.

In the networked environment 10, the computing environment 100, the host computing machines 102, 104, and 106, and the client device 190 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The network 170 can be embodied by various network devices 172, including network switches, routers, bridges, repeaters, and hubs, among others. Packet-based network communications among the host computing machines 102, 104, and 106 can travel through the network devices 172, and depending upon the volume in some cases, place a significant burden on the network devices 172.

According to the concepts of network-efficient isolation environment redistribution described herein, the resource manager 120 can gather network-level context information from the context engines 135-137 based on the network communications surveys performed by the traffic daemons 160-163. Using the network-level context information, the policy engine 124 of the resource manager 120 can generate network context rules and policies for the applications executing in the containers 150-157, among others executing on the VMs 140, 142, and 144.

As one example, the traffic daemons 160 and 163 can identify a significant amount of traffic over the network 170 between the containers 150 and 156. High network traffic between the containers 150 and 156 can occur, for example, if the containers 150 and 156 are relied upon to execute the data storage and domain tiers, respectively, of the same application.

The traffic daemons 160 and 163 can provide data representative of the high network traffic between the containers 150 and 156 to the context engines 135 and 137. This network traffic data can be formatted in any suitable way to convey or be representative of, at least in part, the amount or volume of network traffic between the containers 150 and 156. The context engines 135 and 137 can consolidate the network traffic data from the traffic daemons 160 and 163, among others, as network-level context information. The context engines 135 and 137 can provide the consolidated, network-level context information back to the policy engine 124 of the resource manager 120. In turn, the policy engine 124 can generate a network context policy that stipulates host colocation of the container 150 with the container 156, because the applications executing in the containers 150 and 156 communicate with each other over the network 170 to a significant extent. The policy engine 124 can apply one or more thresholds, rules, or other metrics to identify the types and volumes of network communications for which network context policies are generated. The network context policies generated by the policy engine 124 can be stored as the network policies 114 in the data store 110.

The migration manager 122 of the resource manager 120 can reference the network policies 114 and identify the host colocation policy for the containers 150 and 156, among other rules and policies. Provided that no other policy preempts or overrides the colocation of the containers 150 and 155 on the same host machine, the migration manager 122 can migrate the container 150 from the VM 140 in the host computing machine 102 to the VM 144 in the host computing machine 106. Alternatively, the migration manager 122 can migrate the container 156 from the VM 144 in the host computing machine 106 to the VM 140 in the host computing machine 102. The migration can occur automatically according to a predetermined schedule, for example, by the resource manager 120. In other cases, the migration can be prompted or confirmed by an administrator through a user interface associated with the resource manager 120 on the client device 190.

The load on the network devices 172 can be reduced by migrating the containers 150 and 156 to execute on the same host, because it is no longer necessary for the network communications between the containers 150 and 156 to traverse the network 170. Instead, all communications between the containers 150 and 156 can be routed through inter-process communications (IPC), virtualized network communications, or other techniques within the machine upon which the containers 150 and 155 are hosted.

Thus, the network policies 114 in the data store 110 can be relied upon by the resource manager 120 as network-level feedback to make distributed resource management decisions, such as decisions to migrate VMs and containers within the cluster 101 for efficiency. The resource manager 120 can redistribute isolation environments among the host computing machines 102, 104, and 106 in the cluster 101 based on network-level data in addition to resource-level information, such as processing availability and demand, memory availability and demand, service level agreements and requirements, and other factors.

The affinity policies 112 can also be referenced by the resource manager 120 to make distributed resource management decisions. The affinity policies 112 can include a number of predefined rules or policies that specify affinity and anti-affinity relationships between various applications. For example, an affinity rule can specify that the applications in the containers 150 and 151 should or must be executed on the same host machine. On the other hand, an example anti-affinity rule can specify that the applications in the containers 152 and 157 should or must not be executed on the same host machine. The affinity policies 112 can be created or defined by users through the client device 190, specified by developers of the related applications, or defined in other suitable ways. The affinity policies 112 can be based on various considerations, such as redundancy, service level agreements, scalability, and other factors. In any case, the affinity policies 112 can be based on considerations and factors other than the network-level feedback used to define the network policies 114.

Figure 2:
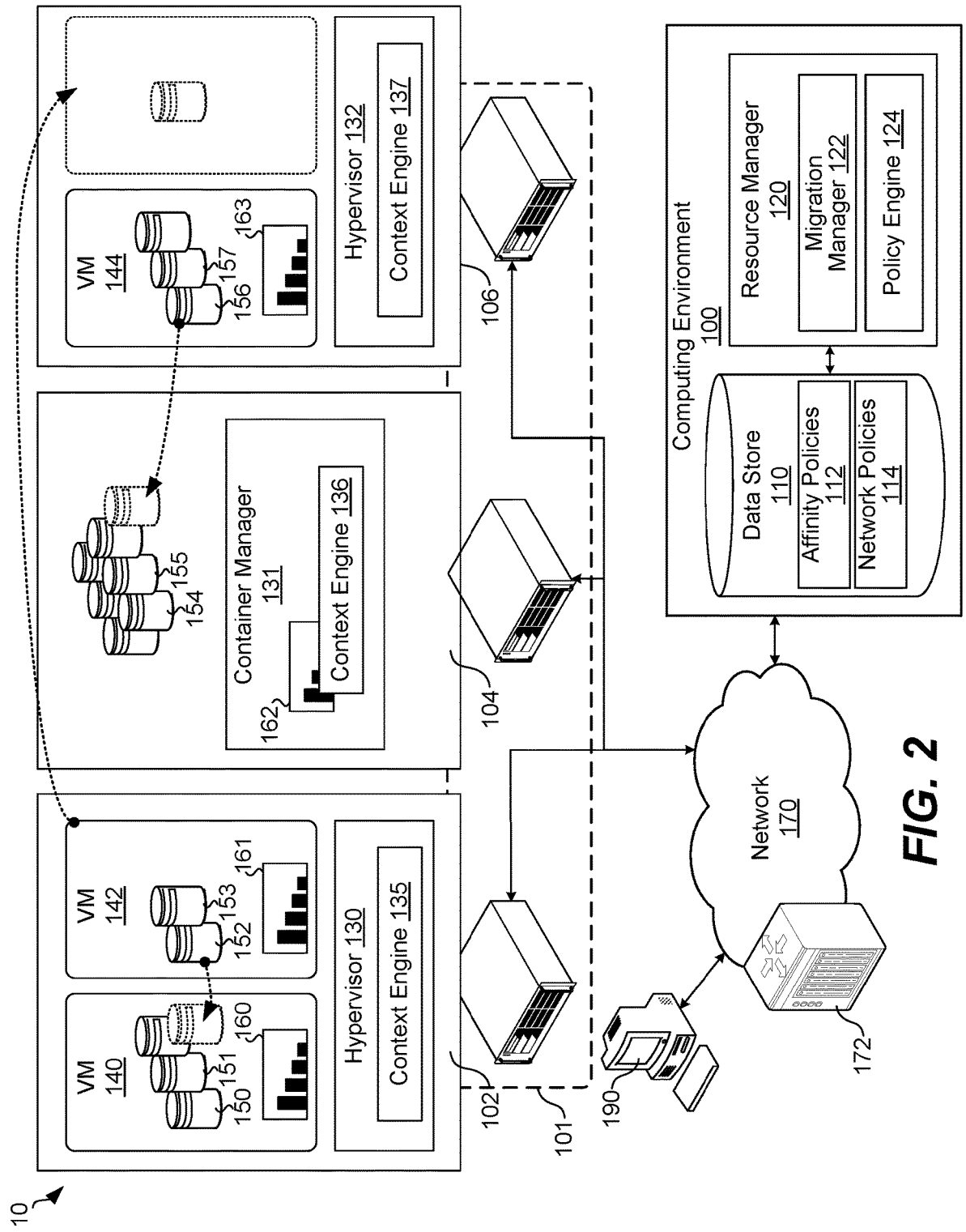
FIG. 2 illustrates an example of isolation environment redistribution according to various examples described herein.

FIG. 2 illustrates other examples of isolation environment redistribution performed by the resource manager 120 based on network-level data obtained and gathered by the traffic daemons 160-163 and the context engines 135-137. In addition or as an alternative to migrating containers from one VM to another VM in a different host computing machine of the cluster 101, the resource manager 120 can also migrate containers into and out of VMs. For example, the traffic daemons 162 and 163 can identify a significant amount of traffic over the network 170 between the containers 155 and 156. The traffic daemons 162 and 163 can provide data representative of the high network traffic to the context engines 136 and 137. The context engines 136 and 137 can consolidate the network traffic data and provide consolidated, network-level context information back to the policy engine 124. The policy engine 124 can generate a network context policy that stipulates host colocation of the container 155 with the container 156, because the applications executing in the containers 155 and 156 communicate with each other over the network 170 to a significant extent.

The resource manager 120 can reference the network policies 114 and identify the host colocation policy for the containers 155 and 156. The resource manager 120 can migrate the container 156 from the VM 144 in the host computing machine 106 to the containerized environment provided by the container manager 131 in the host computing machine 104 as shown in FIG. 2. Alternatively, the resource manager 120 can migrate the container 155 from the containerized environment in the host computing machine 104 to the virtualized environment provided by the VM 144 in the host computing machine 106. In either case, the load on the network devices 172 can be reduced because it is no longer necessary for the network communications between the containers 155 and 156 to traverse the network 170.

In another example, the traffic daemons 161-163 can identify a significant amount of traffic between all of the containers 150, 155, and 156. In that case, the context engines 135-137 can consolidate data on this network traffic for analysis by the policy engine 124. The policy engine 124 can generate a network context policy that stipulates host colocation of the containers 150, 155, and 156. The policy engine 124 can apply one or more thresholds, rules, or other metrics to identify a preference for colocation of all the containers 150, 155, and 156 together, if possible.

Before migrating VMs and containers, however, the migration manager 122 of the resource manager 120 can evaluate the affinity policies 112 in addition to the network policies 114 generated by the policy engine 124. As described above, the affinity policies 112 can define affinity and anti-affinity rules for various applications executing on the cluster 101. For example, the affinity policies 112 may include an anti-affinity rule that specifies a distributed computing arrangement for the applications executing in the containers 152 and 157. According to the anti-affinity rule, the applications executing in the containers 152 and 157 should not be executed on the same host computing machine. This anti-affinity rule might be based on various considerations, such as redundancy, service level agreements, scalability, and other factors. The affinity policies 112 can be defined in various ways, including by an administrator using the client device 190 and automatically based on redundancy, service level agreements, scalability, and other factors.

In certain cases, the resource manager 120 can prioritize the affinity policies 112 over the network policies 114. In that scenario, an anti-affinity policy between two applications can prevent the colocation of the two applications on the same host computing machine in the cluster 101. In other cases, the resource manager 120 can weight or balance the affinity policies 112 with the network policies 114. In that scenario, one of the network policies 114 can outweigh one of the affinity policies 112, for example, based on a very high level of network traffic between applications verses a preference (but not rule) against colocation of the applications on the same host computing machine.

The resource manager 120 can migrate or redistribute both containers and VMs based on the network-level context obtained by the traffic daemons 160-163 and context engines 135-137. For example, the traffic daemons 161 and 163 and the context engines 135 and 137 can identify a significant amount of network traffic between applications (both containerized and non-containerized) between the VM 142 and the VM 144. The policy engine 124 can generate a network context policy that stipulates the colocation of the VMs 142 and 144, and the network context policy can be stored in the network policies 114 as described herein. Further, the migration manager 122 can migrate the VM 142 from the host computing machine 102 to the host computing machine 106, for colocation with the VM 144, and the reduction of network traffic between the VMs 142 and 144 over the network 170.

Before the resource manager 120 migrates the VM 142 to the host computing machine 106, the migration manager 122 can also evaluate any affinity policies 112 associated with the applications executing on the VM 142 to determine whether the migration would result in any affinity policy conflicts. For example, the affinity policies 112 can include the anti-affinity rule between the container 152 in the VM 142 and the container 157 in the VM 144, as described above. The migration manager 122 can identify that the migration of the VM 142 to the host computing machine 106 would result in the violation of this anti-affinity rule, because it would result in colocation of the containers 152 and 157 at the host computing machine 106. To complete the migration of the VM 142 without violating the anti-affinity rule between the containers 152 and 157, the migration manager 122 can first migrate the container 152 from the VM 142 to the VM 140, as shown in FIG. 2, and then migrate the VM 142 to the host computing machine 106. In this way, network traffic between the VMs 142 and 144 can be reduced while avoiding any anti-affinity rules.

Figure 3:
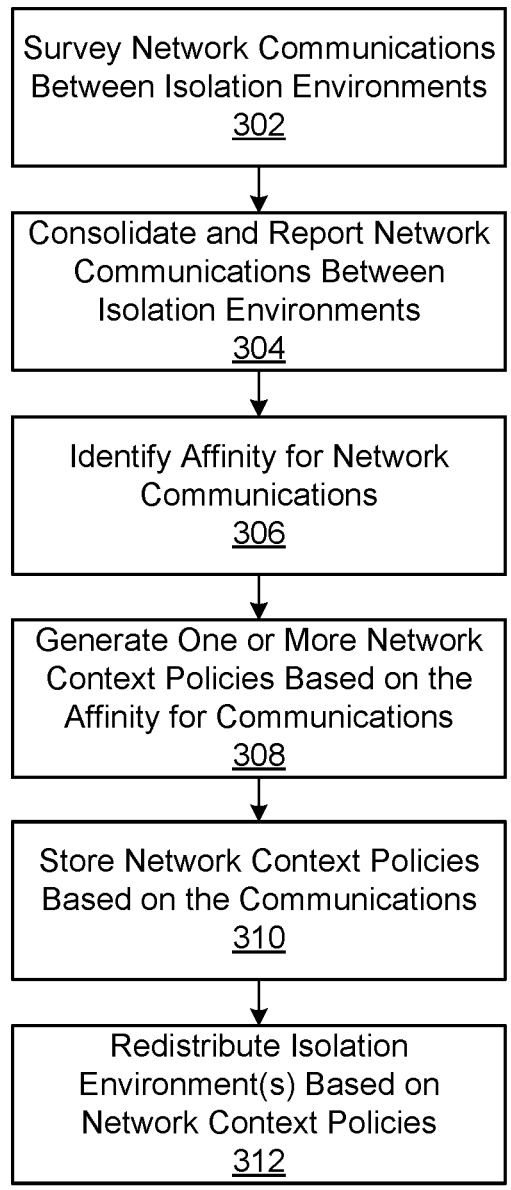
FIG. 3 illustrates an example process for isolation environment redistribution according to various examples described herein.

Turning to other examples, FIGS. 2 and 3 illustrate processes for isolation environment redistribution according to various examples described herein. The processes are described in connection with the components of the networked environment 10 shown in FIG. 1, although other components in other environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 302, the process can include one or more of the traffic daemons 161-163 surveying the network communications among the isolation environments hosted on the cluster 101. For example, the traffic daemons 161-163 can survey the inbound and outbound network communications to and from the VMs 140, 142, and 144 and the containers 150-157, which are example isolation environments, over the network 170. Step 302 results in the collection of network context data that can be relied upon in later steps to redistribute one or more of the isolation environments in the cluster 101 and reduce the overall level of network communications over the network 170.

At step 304, the process can include the context engines 135-137 receiving and consolidating the network context data from the traffic daemons 161-163. Although FIG. 1 illustrates a relatively small number of traffic daemons, tens, hundreds, or thousands of similar traffic daemons can be relied upon in practice. Thus, the context engines 135-137 can consolidate a significant amount of network context data related to the inbound and outbound network communications from a significant number of processes and applications. The context engines 135-137 can consolidate the network context data to any suitable format for review and analysis by the resource manager 120. After it is consolidated, the context engines 135-137 can also report the network context data to the resource manager 120.

At step 306, the process can include the policy engine 124 of the resource manager 120 identifying, among the VMs 140, 142, and 144 and the containers 150-157, an affinity for network communications between certain ones, based on the network context data received from the context engines 135-137. For example, the policy engine 124 can identify a significant amount of traffic over the network 170 between the containers 150 and 156 based on an analysis of the network context data. Additionally, the policy engine 124 can identify a significant amount of traffic over the network 170 between the VMs 142 and 144 based on an analysis of the network context data. The policy engine 124 can apply one or more network-traffic thresholds, rules, or other metrics to identify the affinity for network communications between the containers 150 and 156 and between the VMs 142 and 144.

At step 308, the process can include the policy engine 124 generating one or more network context policies based on the affinity for network communications between certain ones of the VMs 140, 142, and 144 and the containers 150-157. For example, the policy engine 124 can generate a network context policy that stipulates host colocation between the containers 150 and 156 based on the affinity for network communications between them. Additionally, the policy engine 124 can generate a network context policy that stipulates host colocation between the VMs 142 and 144 based on the affinity for network communications between them. The policy engine 124 can also update and revise the network context policies as the affinity for network communications between the VMs 140, 142, and 144 and the containers 150-157 changes or trends over time.

At step 310, the process can include the policy engine 124 storing the network context policies generated at step 308 as part of the network policies 114 in the data store 110. The network policies 114 can be updated in the data store 110 by the policy engine 124 over time as the affinity for network communications between the VMs 140, 142, and 144 and the containers 150-157 change or trend over time.

Figure 4:
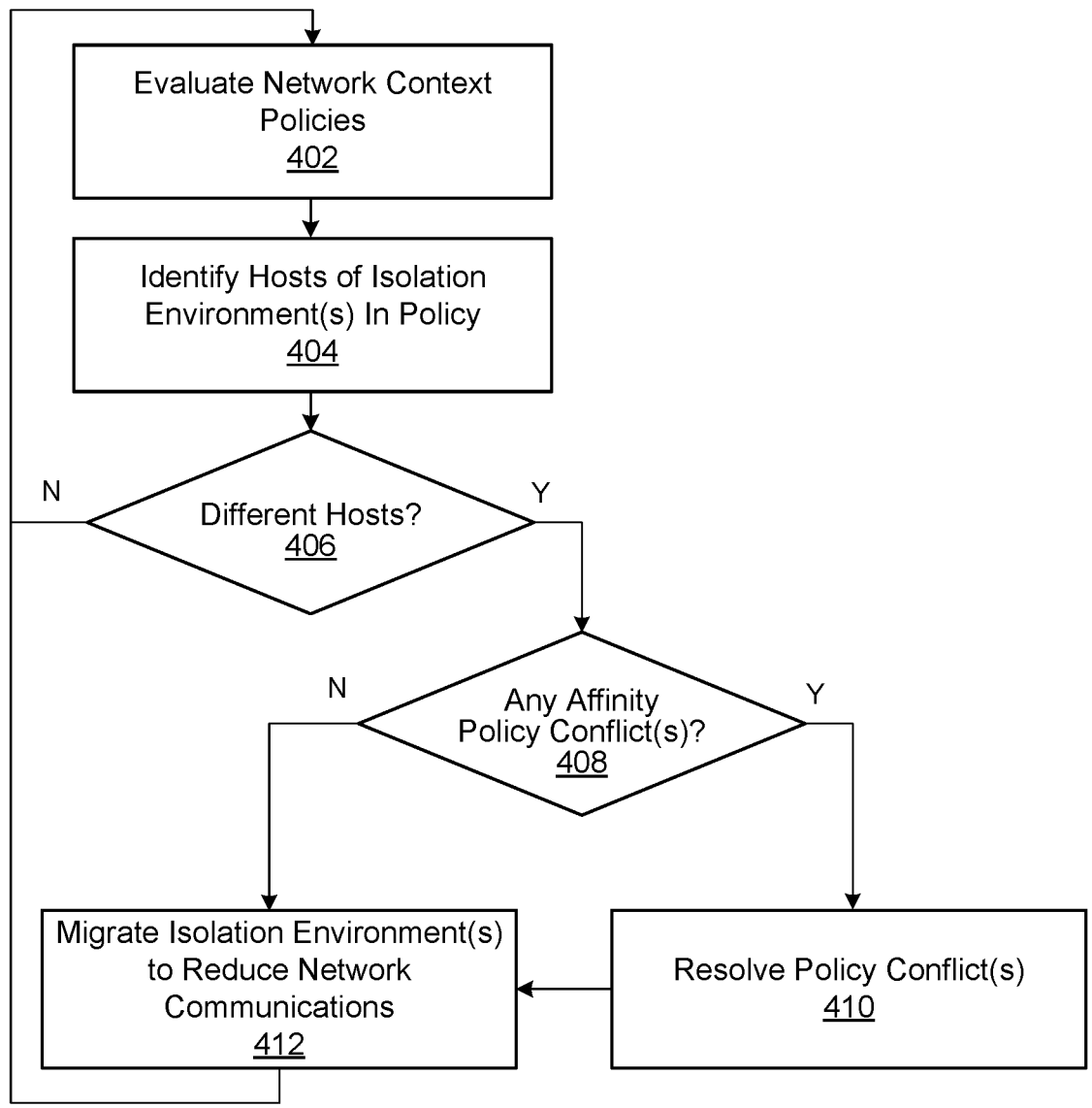
FIG. 4 further illustrates an example process for isolation environment redistribution according to various examples described herein.

At step 312, the process can include the resource manager redistributing one or more of the isolation environments (e.g., one or more of the VMs 140, 142, and 144 and the containers 150-157) based on the network context policies generated at step 308 and stored in the data store 110 at step 310. FIG. 4 illustrates examples of the redistributing at step 312. Along with the other steps, the redistribution at step 312 can be a continuous process, and any number of isolation environments in the cluster 101 can be redistributed among the host computing machines 102, 104, and 106 over time based on the network-level context information.

Turning to FIG. 4, at step 402, the process can include the migration manager 122 evaluating one or more of the network policies 114 in the data store 110. Based on the network policies 114, the migration manager 122 can identify one or more of the isolation environments in the cluster 101 that can be (or should not be) hosted together on the same host computing machine to reduce network traffic over the network 170. That is, the migration manager 122 can identify one or more of the VMs 140, 142, and 144 and the containers 150-157 in the cluster 101 that can or should be (or should not be) hosted together to reduce network traffic over the network 170 based on the network policies 114 in the data store 110. The network-level context data in the network policies 114 can be evaluated in any suitable way, such as by considering a number of different network context policies in turn over time. Thus, the process shown in FIG. 4 can be considered an ongoing process of the migration manager 122.

At step 404, the process can include the migration manager 122 identifying, for a pair or group of the isolation environments that can or should be hosted together, which host computing machine 102, 104, and 106 is currently hosting each environment. For example, the migration manager 122 can identify, among the containers 150 and 156 which have an affinity for communications between each other, that the container 150 is hosted on the host computing machine 102 and that the container 156 is hosted on the host computing machine 106. The migration manager 122 can also identify that the VM 142 is hosted on the host computing machine 102 and that the VM 144 is hosted on the host computing machine 106.

At step 406, the process can include the migration manager 122 determining whether the isolation environments that can or should be hosted together are being executed on different hosts. For example, the migration manager 122 can determine that the containers 150 and 156 are hosted on different hosts in the cluster 101 and that the VMs 142 and 144 are hosted on different hosts in the cluster 101. If the isolation environments which have an affinity for communications between each other are being hosted on different hosts in the cluster 101, then the process can proceed to step 408. Otherwise, if the isolation environments which have an affinity for communications between each other are hosted on the same host in the cluster 101, then the process can proceed back to step 402 to evaluate another one of the network policies 114 in the data store 110.

At step 408, the process can include the migration manager 122 determining whether any affinity policy conflict exists with regard to the isolation environments which have an affinity for communications between each other. As described above, the affinity policies 112 in the data store 110 can include an anti-affinity rule between the container 152 in the VM 142 and the container 157 in the VM 144, for example. In that case, even if an affinity for communications exists between the VMs 142 and 144, the migration manager 122 can identify at step 408 that the migration of the VM 142 to the host computing machine 106 would result in the colocation of the containers 152 and 157 at the host computing machine 106, which violates one of the affinity policies 112. The process can proceed to step 410 in the case of the identification of a violation of one of the affinity policies 112 at step 408. On the other hand, if no violation is identified, the process can proceed directly to step 412.

At step 410, the process can include the migration manager 122 resolving the policy conflict identified or determined at step 408. For example, to complete the migration of the VM 142 without violating the anti-affinity rule between the containers 152 and 157, the migration manager 122 can first migrate the container 152 from the VM 142 to the VM 140 at step 408, as shown in FIG. 2 and described above.

After the policy conflict is resolved at step 410, the process can proceed to step 412. At step 412, the migration manager 122 can migrate the isolation environments which have an affinity for communications between each other to execute together on the same host in the cluster 101. For example, the migration manager 122 can migrate the VM 142 to the host computing machine 106 for execution along with the VM 144 to reduce the network communications over the network 170. In this way, network traffic between the VMs 142 and 144, among other isolation environments in the cluster 101, can be reduced based on the network-level context gathered by the traffic daemons 160-163 and the context engines 135-137. At the same time, the violation of the affinity policies 112 can be avoided.

The flowcharts in FIGS. 3 and 4 show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 and each of the host computing machines 102, 104, and 106 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the client device 190 can include at least one processing circuit. Such a processing circuit can include, for example, one or more processors and one or more storage or memory devices coupled to a local interface.

The storage or memory devices can store data or components that are executable by the processors of the processing circuit. For example, the resource manager 120 and/or other components can be stored in one or more storage devices and be executable by one or more processors in the computing environment 100. Similarly, the migration manager 122, the policy engine 124, and other components can be stored in one or more storage devices and be executable by one or more processors in the computing environment 100.

The resource manager 120, migration manager 122, policy engine 124, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the resource manager 120, migration manager 122, policy engine 124, and other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for isolation environment redistribution in a computing environment, comprising:
   surveying inter-environment network communications among a plurality of isolation environments hosted on a distributed computing resource cluster;
   identifying, among the plurality of isolation environments, an affinity for network communications between a first virtual machine and a second virtual machine based on the inter-environment network communications;
   determining that the first virtual machine and the second virtual machine are executed on different hosts in the distributed computing resource cluster, the first virtual machine being executed on a first host in the distributed computing resource cluster and the second virtual machine being executed on a second host in the distributed computing resource cluster;
   identifying that an execution of the first virtual machine and the second virtual machine on a same host in the distributed computing resource cluster could result in a conflict in an affinity policy, the affinity policy specifying an anti-affinity relationship between a first application and a second application;
   generating a network policy based at least in part on a level of network traffic between the first application executed on the first virtual machine and the second application executed on the second virtual machine meeting a threshold, the network policy indicating a host colocation of the first virtual machine and the second virtual machine;
   determining that the network policy is prioritized over the affinity policy based at least on a threshold level of network traffic between the first application and the second application being weighed higher than a preference setting for the affinity policy; and
   migrating the second virtual machine to the first host based on the prioritization of the network policy over the affinity policy.

2. The method according to claim 1, wherein migrating the second virtual machine comprises migrating the second virtual machine to the first host for the execution on the first host with the first virtual machine to reduce the inter-environment network communications in the distributed computing resource cluster between the first host and the second host.

3. The method according to claim 1, wherein the network policy stipulates host colocation of a first isolation environment and a second isolation environment to reduce the inter-environment network communications in the distributed computing resource cluster based on the affinity for network communications.

4. The method according to claim 1, wherein the affinity policy prevents a colocation of the first application and the second application on the same host in the distributed computing resource cluster, wherein the first application is executed on the first virtual machine and the second application is executed on the second virtual machine.

5. The method according to claim 1, further comprising:
   receiving a network-level context from a first traffic daemon executed on the first virtual machine and a second traffic daemon executed on the second virtual machine; and
   generating the network policy based on the network-level context.

6. The method according to claim 1, wherein identifying the execution of the first virtual machine and the second virtual machine on the same host in the distributed computing resource cluster could result in the conflict of the affinity policy further comprising:
   identifying that the conflict based on a migration of a first container executed on the first virtual machine to the same host of a second container executed on the second virtual machine is a violation of the affinity policy.

7. The method according to claim 1, wherein the first virtual machine comprises a first traffic daemon and the second virtual machine comprises a second traffic daemon, and the first traffic daemon and the second traffic daemon monitor network traffic.

8. The method of claim 1, wherein surveying the inter-environment network communications comprising using a traffic daemon to survey an inbound communication and an outbound communication for the first virtual machine and the second virtual machine.

9. At least one computing device for isolation environment redistribution, comprising:
   a memory device configured to store computer-readable instructions thereon; and
   at least one processing device configured, through execution of the computer-readable instructions, to direct the at least one computing device to at least:
      survey inter-environment network communications among a plurality of isolation environments hosted on a distributed computing resource cluster;
      identify, among the plurality of isolation environments, an affinity for network communications between a first virtual machine and a second virtual machine based on the inter-environment network communications;
      determine that the first virtual machine and the second virtual machine are executed on different hosts in the distributed computing resource cluster, the first virtual machine being executed on a first host in the distributed computing resource cluster and the second virtual machine being executed on a second host in the distributed computing resource cluster;
      identify that an execution of the first virtual machine and the second virtual machine on a same host in the distributed computing resource cluster could result in ft conflict of an affinity policy, the affinity policy specifying an anti-affinity relationship between a first application and a second application;
      generate a network policy based at least in part on a level of network traffic between the first application executed on the first virtual machine and the second application executed on the second virtual machine meeting a threshold, the network policy indicating a host colocation of the first virtual machine and the second virtual machine
      determine that the network policy is prioritized over the affinity policy based at least on a threshold level of network traffic between the first application and the second application being weighed higher than a preference setting for the affinity policy; and
      migrate the second virtual machine to the first host based on the prioritization of the-network policy over the affinity policy.

10. The at least one computing device of claim 9, wherein migrating the second virtual machine comprises migrating the second virtual machine to the first host for execution on the first host with the first virtual machine to reduce the inter-environment network communications in the distributed computing resource cluster between the first host and the second host.

11. The at least one computing device of claim 9, wherein the network policy stipulates host colocation of a first isolation environment and a second isolation environment to reduce the inter-environment network communications in the distributed computing resource cluster based on the affinity for network communications.

12. The at least one computing device of claim 9, wherein the affinity policy prevents a colocation of the first application and the second application on the same host in the distributed computing resource cluster, wherein the first application is executed on the first virtual machine and the second application is executed on the second virtual machine.

13. The at least one computing device of claim 9, wherein the at least one computing device is further directed to at least:
receive a network-level context from a first traffic daemon executed on the first virtual machine and a second traffic daemon executed on the second virtual machine; and
generate the network policy based on the network-level context.

14. The at least one computing device of claim 9, wherein identifying the execution of the first virtual machine and the second virtual machine on the same host in the distributed computing resource cluster could result in the conflict of the affinity policy that further directs the at least one computing device to at least:
identify that the conflict based on a migration of a first container executed on the first virtual machine to the same host of a second container executed on the second virtual machine is a violation of the affinity policy.

15. The at least one computing device of claim 9, wherein the first virtual machine comprises a first traffic daemon and the second virtual machine comprises a second traffic daemon, and the first traffic daemon and the second traffic daemon monitor network traffic.

16. A non-transitory computer-readable medium embodying program code for isolation environment redistribution in a computing environment that, when executed by at least one computing device, directs the at least one computing device to at least:
survey inter-environment network communications among a plurality of isolation environments hosted on a distributed computing resource cluster;
identify, among the plurality of isolation environments, an affinity for network communications between a first virtual machine and a second virtual machine based on the inter-environment network communications;
determine that the first virtual machine and the second virtual machine are executed on different hosts in the distributed computing resource cluster, the first virtual machine being executed on a first host in the distributed computing resource cluster and the second virtual machine being executed on a second host in the distributed computing resource cluster;
identify that execution of the first virtual machine and the second virtual machine on a same host in the distributed computing resource cluster could result in an affinity policy conflict, the affinity policy specifying an anti-affinity relationship between a first application and a second application;
generate a network policy based at least in part on a level of network traffic between the first application executed on the first virtual machine and the second application executed on the second virtual machine meeting a threshold, the network policy indicating a host colocation of the first virtual machine and the second virtual machine;
determine that the network policy is prioritized over the affinity policy conflict based at least on a threshold level of network traffic between the first application and the second application being weighed higher than a preference setting for the affinity policy; and
migrate the second virtual machine to the first host based on the prioritization of the network policy over the affinity policy.

17. The non-transitory computer-readable medium according to claim 16, wherein migrating the second virtual machine comprises migrating the second virtual machine to the first host for execution on the first host with the first virtual machine to reduce the inter-environment network communications in the distributed computing resource cluster between the first host and the second host.

18. The non-transitory computer-readable medium according to claim 16, wherein the network policy stipulates host colocation of a first isolation environment and a second isolation environment to reduce the inter-environment network communications in the distributed computing resource cluster based on the affinity for network communications.

19. The non-transitory computer-readable medium according to claim 16, wherein the affinity policy conflict prevents a colocation of the first application and the second application on the same host in the distributed computing resource cluster, wherein the first application is executed on the first virtual machine and the second application is executed on the second virtual machine.

20. The non-transitory computer-readable medium according to claim 16, wherein the program code, when executed by the at least one computing device, directs the at least one computing device to at least:
receive a network-level context from a first traffic daemon executed on the first virtual machine and from a second traffic daemon executed on the second virtual machine; and
generate the network policy based on the network-level context.

\* \* \* \* \*